UNITED STATES PATENT OFFICE.

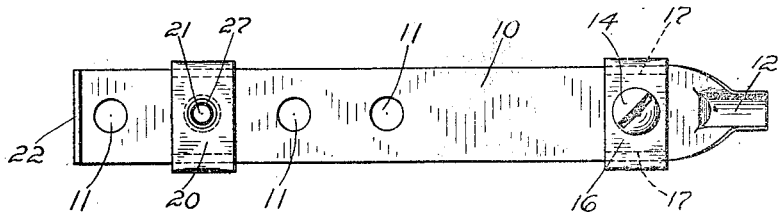
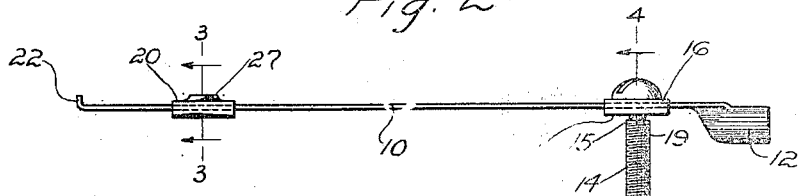
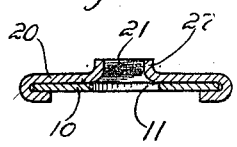
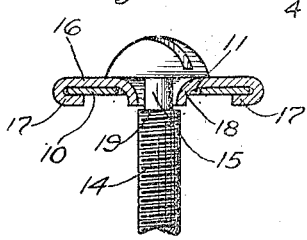
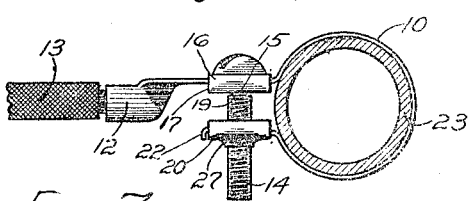
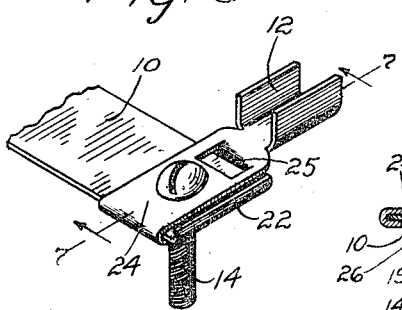
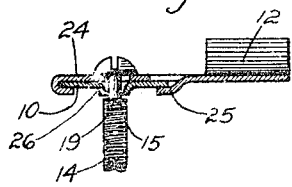

HOWARD H. HAYNES, OF BRIDGEPORT, AND TONJES A. BOTH, OF STRATFORD, CONNECTICUT, ASSIGNORS TO THE CONNECTICUT ELECTRIC MANUFACTURING COMPANY, A CORPORATION OF CONNECTICUT.

GROUND-CLAMP.

1,268,457.

Specification of Letters Patent.

Patented June 4, 1918.

Continuation of application Serial No. 180,726, filed July 16, 1917. This application filed January 14, 1918. Serial No. 211,775.

*To all whom it may concern:*

Be it known that we, (1) HOWARD H. HAYNES and (2) TONJES A. BOTH, citizens of the United States, residing at (1) 1296 Noble Ave., Bridgeport, Conn., (2) 1477 West Broad St., Stratford, county of Fairfield, State of Connecticut, have invented an Improvement in Ground-Clamps, of which the following is a specification.

This application is a continuation of our application Serial Number 180,726, filed July 16, 1917 and allowed Nov. 26, 1917.

This invention has for its object the production of a simple and inexpensive ground clamp adapted for use in connection with electrical conductors wherever it is required to ground the current, as by means of a pipe or rod extending to the ground or having ground connection, the requirements being that the clamp be adaptable to different sizes of pipes and rods, within reasonable limits, and that it be adapted for easy attachment and be without detachable parts. With these and other objects in view, we have devised the novel ground clamp which we will now describe referring to the accompanying drawing forming a part of this specification and using reference characters to indicate the several parts.

Figure 1 shows our novel ground clamp in elevation;

Fig. 2 is an edge view corresponding therewith;

Fig. 3 a section on an enlarged scale on the line 3—3 in Fig. 2, looking in the direction of the arrows;

Fig. 4 a section on the line 4—4 in Fig. 2, looking in the direction of the arrows;

Fig. 5 a view illustrating the use of our novel ground clamp;

Fig. 6 a perspective view showing a modified form, and

Fig. 7 is a section on the line 7—7 in Fig. 6.

10 denotes a metallic strip which may be of any required length and is provided with a plurality of holes 11, and at one end with means, in the present instance, a trough shaped socket 12, adapted to receive the end of an electrical conductor, indicated by 13, which may be soldered or otherwise secured therein. Contiguous to the socket we provide a screw 14 which is permanently but loosely secured in place. The screw is shown as provided with a reduced neck 15 and as passing through a hole in a clip 16 and through a larger hole in the strip. The clip is simply a strip of metal lying transversely to strip 10 and having its ends 17 curved over the edges of the strip, as clearly shown in Fig. 4. The metal surrounding the hole in the clip is punched through the hole in the strip and forms a flange 18 which receive the neck of the screw loosely, the hole being of less diameter than the body of the screw so that the end of the flange, by engagement with a shoulder 19 at the intersection of the neck with the body of the screw, will hold the screw against dropping out, but leave it loosely retained in place. 20 denotes a slide which is adapted to be moved longitudinally on the strip. The slide is formed substantially similarly to the clip, its ends being curved over the edges of the strip, and is provided with a threaded hole 21 for engagement by the screw. Hole 21 may or may not be formed in a hub 27 punched out from the slide. Having placed the slide on the strip, the end of the strip is bent at an angle as at 22 to retain the slide against removal therefrom.

In Fig. 5, we have illustrated the use of our novel ground clamp. The conductor is secured in the socket as shown, the strip is passed around a pipe or rod indicated by 23, and the screw is passed through one of the holes 11 in the strip, and engaged with the threaded hole in the slide and tightened up. The strips may be made of any required length and each strip is provided with a plurality of holes to adapt it for use in connection with different sizes of pipes or rods, within reasonable limits.

The form illustrated in Figs. 6 and 7 differs in that the socket or other attaching means for the conductor is made part of a modified form of clip, indicated by 24 and lies transversely to the strip instead of longitudinally thereto. In this form, one end of the clip is curved about an edge of the strip as before, the other edge of the strip being engaged by a lug 25 which is struck out from the metal of the clip and bent to place, as clearly shown in Fig. 7. Still another change in details of construction is shown in Fig. 7. Instead of a flange 18 formed from the metal of the clip and punched through a hole in the strip, as a retaining means for the screw, the screw is passed through a flangeless hole in the clip and a retaining flange 26 is punched out of the metal of the strip and coöperates with the shoulder upon the screw to retain the latter against detachment from the strip in the same manner as the flange 18 in the other form.

Having thus described our invention, we claim:—

1. A ground clamp comprising a strip of metal having a plurality of holes and at one end means for the attachment of a conductor, a screw loosely secured to the strip, and a slide having a threaded hole adapted to register with any of the holes in the strip and to be engaged by the screw to clamp the strip about a ground connection.

2. A ground clamp comprising a strip of metal having a plurality of holes and at one end a socket for the attachment of a conductor, a screw loosely secured to the strip contiguous to the socket, and a slide having a threaded hole adapted to be engaged by the screw when the hole in the slide is in alinement with any of the holes in the strip.

3. A ground clamp comprising a strip of metal having a plurality of holes and at one end a socket for the attachment of a conductor, a slide on the strip having a threaded hub adapted to register with any of said holes, a screw having a reduced neck, and a clip having a hole with the metal surrounding said hole punched through a hole in the strip to form a flange which coöperates with the neck to loosely secure the screw to the strip.

4. A ground clamp comprising a strip of metal having a plurality of holes and means for the attachment of a conductor, a slide having its ends curved about the edges of the strip and a threaded hub adapted to register with any of said holes, a screw having a reduced neck and a shoulder, and a clip having its ends curved about the strip and having a hole with the surrounding metal punched through a hole in the strip to form a flange which incloses the neck and is adapted to engage the shoulder, for the purpose set forth.

5. A ground clamp comprising a strip of metal having a plurality of holes and at one end means for the attachment of a conductor, a screw loosely secured to the strip, a slide having a threaded hole adapted to register with any of the holes in the strip, and means for retaining the slide on the strip.

In testimony whereof we affix our signatures.

HOWARD H. HAYNES.
TONJES A. BOTH.